United States Patent
Li

(10) Patent No.: US 8,452,893 B2
(45) Date of Patent: May 28, 2013

(54) METHOD AND MEMBER DEVICE FOR TRAFFIC FORWARDING IN A STACKING APPARATUS

(75) Inventor: Jie Li, Beijing (CN)

(73) Assignee: Hangzhou H3C Technologies Co., Ltd., Hangzhou, Zhejiang (CN)

( * ) Notice: Subject to any disclaimer, the term of this patent is extended or adjusted under 35 U.S.C. 154(b) by 436 days.

(21) Appl. No.: 12/840,650

(22) Filed: Jul. 21, 2010

(65) Prior Publication Data

US 2011/0022726 A1  Jan. 27, 2011

(30) Foreign Application Priority Data

Jul. 23, 2009  (CN) .......................... 2009 1 0158254

(51) Int. Cl.
G06F 13/00  (2006.01)
(52) U.S. Cl.
USPC .......................................................... 709/242
(58) Field of Classification Search
USPC ................................ 370/389, 395.31; 709/241
See application file for complete search history.

(56) References Cited

U.S. PATENT DOCUMENTS

| | | | |
|---|---|---|---|
| 7,864,765 B2 * | 1/2011 | Borkenhagen et al. | ....... 370/389 |
| 2010/0080234 A1 * | 4/2010 | Borkenhagen et al. | .. 370/395.31 |

* cited by examiner

*Primary Examiner* — Robert B Harrell
(74) *Attorney, Agent, or Firm* — Ladas & Parry LLP

(57) ABSTRACT

Embodiments of the present invention provide a method and device for traffic forwarding in a stacking apparatus which includes multiple member devices. The method includes: obtaining, by a member device, a forwarding table size of each member device in the stacking apparatus; choosing a member device having the largest forwarding table as a proxy device when a forwarding table of another member device in the stacking apparatus is larger than that of the member device; transmitting all or part of to-be-forwarded traffic to the proxy device which performs traffic forwarding. According to the present invention, forwarding capability of member devices having larger forwarding tables is utilized for providing proxy forwarding for member device having smaller forwarding tables, so that forwarding sizes of the member devices having different forwarding table sizes in the stacking apparatus are unified and forwarding capabilities of the member devices in the stacking apparatus are fully used.

18 Claims, 4 Drawing Sheets

METHOD AND MEMBER DEVICE FOR TRAFFIC FORWARDING IN A STACKING APPARATUS

FIELD OF THE INVENTION

The present invention relates to communications technology, and particularly, to a method and apparatus for traffic forwarding in a stacking apparatus.

BACKGROUND OF THE INVENTION

Intelligent Resilient FABRIC (IRF) refers to a technique which utilizes a "stacking apparatus". The stacking apparatus is formed by interconnecting multiple devices via stacking ports. An IRF is illustrated in FIG. 1. The stacking apparatus is called a FABRIC, and each device constituting the FABRIC is called a unit (member device). When multiple units form a FABRIC, they become one entity for management and utilization. Port numbers and exchanging capacity of a FABRIC can be increased at any time by increasing the number of units in the FABRIC, thus the FABRIC has remarkable extensibility. Further, reliability of a FABRIC can be improved by making some of the units serve as backup for others. In addition, a FABRIC is managed as one stacking apparatus which facilitates management work of users.

However, the above prior art has drawbacks in that: when it is configured a same size for forwarding tables of all member devices in a stacking apparatus, the traffic forwarding capacity is determined according to the size of the forwarding tables of all the member devices. When a stacking apparatus is formed by member devices having forwarding tables which are different in size, the overall forwarding capacity of the stacking apparatus is determined by the member device which has the smallest forwarding table.

SUMMARY OF THE INVENTION

The present invention provides a method and device for traffic forwarding in a stacking apparatus to improve forwarding capabilities of units in the stacking apparatus.

To achieve the above objective, the present invention provides a method for traffic forwarding in a stacking apparatus including multiple member devices. The method may include:

obtaining, by a member device, a size of a forwarding table of each member device in the stacking apparatus;

choosing, by the member device, a member device having a larger forwarding table as a proxy device when a forwarding table of another member device in the stacking apparatus is larger than a forwarding table of the member device;

transmitting, by the member device, at least part of to-be-forwarded traffic to the proxy device which forwards the traffic.

In the above method, the obtaining by the member device a forwarding table size of each member device in the stacking apparatus may include:

obtaining, by the member device, a Module Identity (MODID) of each member device in the stacking apparatus, identifying each member device by the MODID, and establishing a relation for each member device which associates the MODID of the member device with the forwarding table size of the member device.

When there are multiple member devices whose forwarding tables are larger than that of the member device, the choosing by the member device a member device as a proxy device may include:

choosing, by the member device, at least one member devices from the multiple member devices whose forwarding tables are larger than the member device as the proxy device according to a connection relation between the member device and the multiple member devices and/or according to a forwarding load balancing policy for the multiple member devices having the largest forwarding tables.

The transmitting by the member device at least part of to-be-forwarded traffic to the proxy device may include:

when determining that the forwarding table of the member device is the smallest in size, establishing a proxy entry which makes egress information of all the to-be-forwarded traffic or egress information of to-be-forwarded traffic beyond forwarding capability of the member device point to the proxy device, e.g., the proxy entry may records the MODID of the proxy device or information of a port which connects the member device with the proxy device as the egress information;

when determining that the forwarding table of the member device is larger than the smallest forwarding table and smaller than a forwarding table of the proxy device in size, establishing a proxy entry which makes egress information of to-be-forwarded traffic beyond forwarding capability of the member device point to the proxy device, e.g., by recording the MODID of the proxy device or information of a port connecting the member device with the proxy device in the proxy entry.

The member device may forward the to-be-transmitted traffic locally when the forwarding table of the member device is not smaller than any other member devices in the stacking apparatus.

When a member device in the stacking apparatus is subjected to a change, the method may further include: updating, by the member device, the proxy device according to a size of a forwarding table of each member device after the change; and transmitting the to-be-forwarded traffic to the updated proxy device which forwards the traffic.

Another embodiment of the present invention provides a member device in stacking apparatus, including:

a forwarding table size obtaining unit, adapted to obtain a size of a forwarding table of each member device in the stacking apparatus;

a proxy device choosing unit, adapted to choose a member device having a larger forwarding table as a proxy device when detecting a forwarding table of another member device in the stacking apparatus is larger than a forwarding table of the member device according to an obtaining result of the forwarding table size obtaining unit;

a forwarding control unit, adapted to transmit at least part of to-be-forwarded traffic to the proxy device chosen by the proxy device choosing unit to have the proxy device forward the traffic.

Specifically, the forwarding table size obtaining unit is adapted to:

obtain a Module Identity (MODID) of each member device in the stacking apparatus, identify each member device by the MODID, and establish a relation for each member device which associates a MODID of the member device with a size of a forwarding table of the member device.

When the forwarding table size obtaining unit obtains multiple member devices whose forwarding tables are larger than that of the member device, the proxy device choosing unit is adapted to:

choose at least one member device from the multiple member devices as the proxy device according to a connection relation between the member device and the multiple member devices and/or according to a forwarding load balancing policy for the multiple member devices having the largest forwarding tables.

Specifically, the forwarding control unit is adapted to:

when determining that the forwarding table of the member device is the smallest, establish a proxy entry which makes egress information of all the to-be-forwarded traffic or egress information of to-be-forwarded traffic beyond forwarding capability of the member device point to the proxy device, e.g., by recording the MODID of the proxy device or information of a port which connects the member device with the proxy device in the proxy entry;

when determining that the forwarding table of the member device is larger than the smallest forwarding table and smaller than a forwarding table of the proxy device in size, establish a proxy entry which makes egress information of to-be-forwarded traffic beyond forwarding capability of the member device point to the proxy device.

The forwarding control unit may further be adapted to: forward the to-be-forwarded traffic locally when determining that the forwarding table of the member device is not smaller than a forwarding table size of any other member devices in the stacking apparatus.

The proxy device choosing unit may further be adapted to update, when a member device in the stacking apparatus is subjected to a change, the proxy device according to a size of a forwarding table of each member device after the change; and notify the forwarding control unit to transmit the to-be-forwarded traffic to the updated proxy device to make the updated proxy device forward the traffic.

Compared with the prior art, the present invention has the following advantages:

forwarding capability of member devices having larger forwarding tables is utilized for providing proxy forwarding for member devices having smaller forwarding table, so that the forwarding sizes of member devices having different forwarding table sizes in the stacking apparatus are unified and forwarding capabilities of member devices in the stacking apparatus are fully used.

BRIEF DESCRIPTION OF THE DRAWINGS

In order to describe the technical schemes according to embodiments of the present invention or the prior art more clearly, accompanying drawings for describing the embodiments or the prior art are briefly described. Obviously, the accompanying drawings described hereinafter are just some embodiments, and based on which, other drawings can be obtained without inventive efforts by those skilled in the art.

DETAILED DESCRIPTION OF THE INVENTION

The technical scheme of the present invention will be described hereinafter completely and clearly with reference to accompanying drawings and embodiments. Obviously, the embodiments are just some of embodiments of the present invention, but not all embodiments. Based on the embodiments of the present invention, all the other embodiments proposed by those skilled in the art without inventive efforts are still in the protection scope of the present invention.

Figure 1:
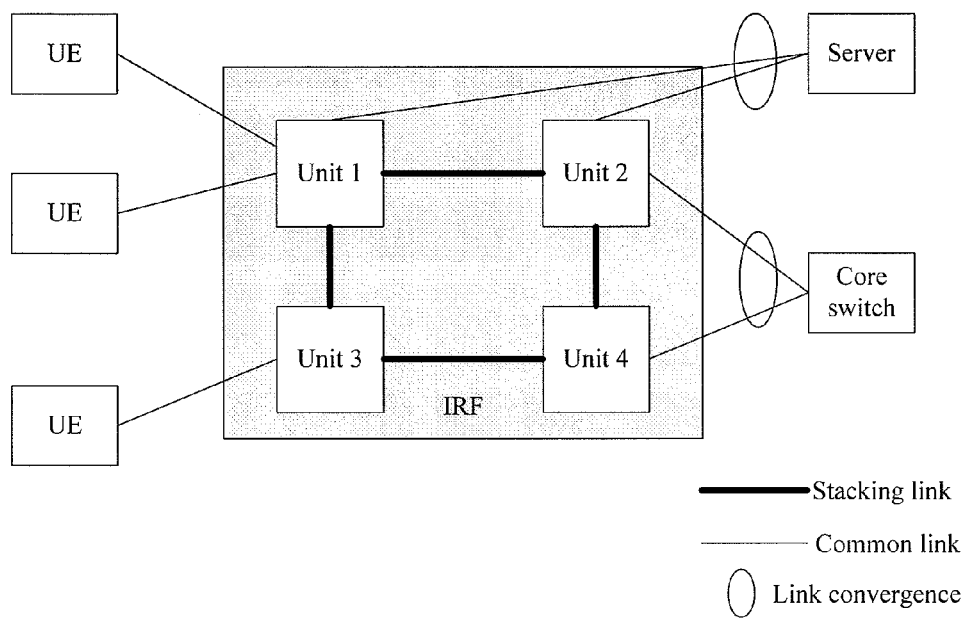
FIG. 1 is a schematic illustrating a structure of a stacking apparatus in accordance with the prior art.
Figure 2:
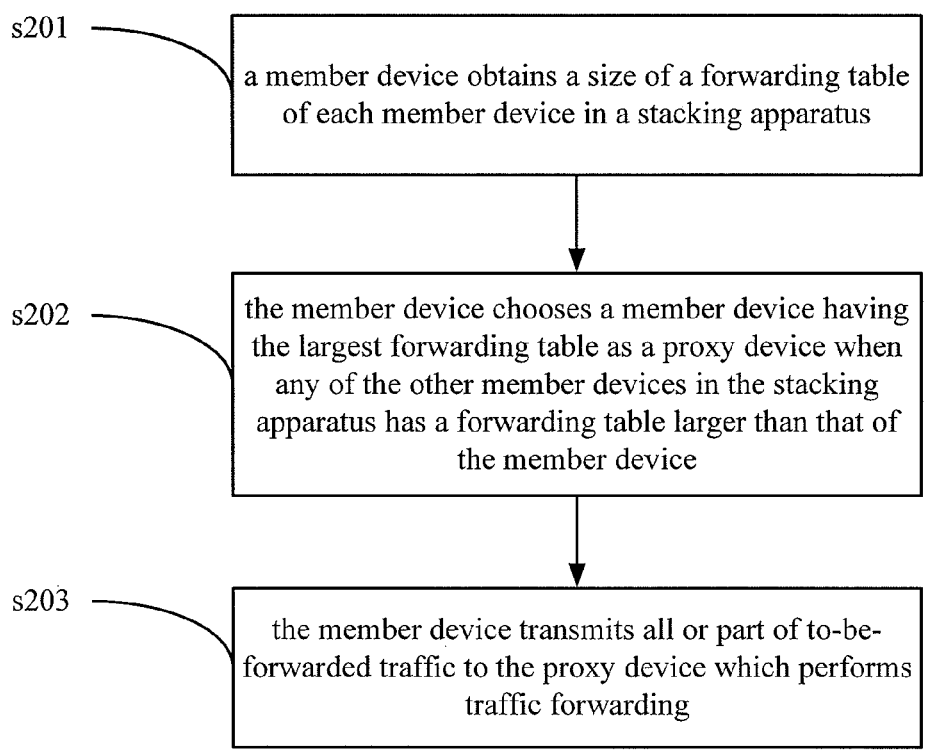
FIG. 2 is a flowchart illustrating a method for traffic forwarding in a stacking apparatus in accordance with an embodiment of the present invention.

An embodiment of the present invention provides a method for traffic forwarding in a stacking apparatus which includes multiple member devices. When the member devices in the stacking apparatus have forwarding tables in different sizes, a member device that has a larger forwarding table serves as a forwarding proxy for another member device that has a smaller forwarding table. The member device may be a stand-alone device or an interface board. Specifically, as shown in FIG. 2, the method may include steps as follows.

In step s201, a member device obtains the size of a forwarding table of each member device in the stacking apparatus.

In step s202, the member device chooses another member device having the largest forwarding table or another member device having a forwarding table larger than that of the member device as a proxy device when there is another member device in the stacking apparatus whose forwarding table is larger than that of the member device in size.

In step s203, the member device transmits all or part of to-be-forwarded traffic to the proxy device, and the proxy device forwards the traffic.

Embodiments of the method for traffic forwarding in a stacking apparatus according to the present invention will be described in detail according to specific application scenarios.

In the stacking apparatus, a unique Module ID (MODID) is assigned to each member device. The MODID assigned to each member device may be related with hardware information of the member device. A member device may obtain MODID of another member device by firstly obtaining hardware information of the another member device through a hand shaking process during which hand shaking messages are exchanged and then calculate the MODID of the another member device based on the hardware information obtained. The size of a forwarding table of another member device may also be obtained by exchanging hand shaking messages with the another member device. Each member device in the stacking apparatus stores a relation for each of the member devices which associates a MODID of the member device with the size of a forwarding table of the member device. Table 2 shows relations stored in a member device whose MODID is 2 as an example.

TABLE 2

MODIDs and sizes of forwarding tables of member devices

| MODID | size of forwarding table |
|---|---|
| 1 | 128000 |
| 2 | 256 |
| 3 | 12000 |
| ... | ... |
| N | n |

According to the relations between the MODIDs and the sizes of forwarding table of the member devices, each member device in a stacking apparatus is able to obtain knowledge about the sizes of forwarding tables of other member devices. Further, when proxy forwarding is determined to be necessary, a proxy device is determined by choosing a MODID from the MODIDs, and to-be-forwarded traffic is transmitted to the proxy device.

In the present invention, each member device in the stacking apparatus may choose the proxy device according to the following manner.

A member device having the largest forwarding entry is determined according to relations between MODIDs and sizes of forwarding tables of the member devices maintained in the member device, and taking the member device having the largest forwarding table as a proxy device.

When there are multiple member devices having the largest forwarding tables, the member device may choose one or more member devices having the largest forwarding tables as one or more proxy devices of the member device based on connection relations between the member device and the multiple member devices having the largest forwarding tables and/or based on a policy for forwarding load balancing the multiple member devices having the largest forwarding table size.

Figure 3:
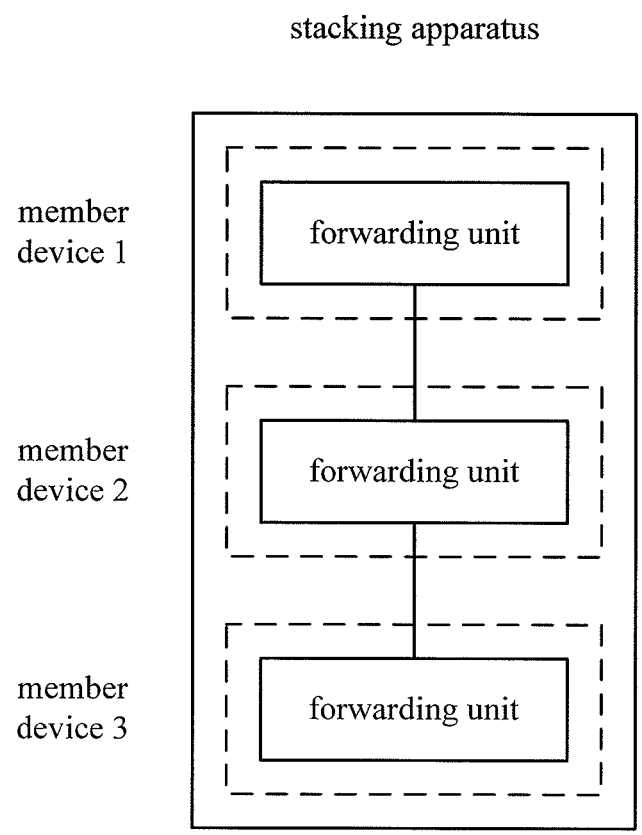
FIG. 3 is a schematic illustrating a network structure adopting a method for traffic forwarding in a stacking apparatus in accordance with an embodiment of the present invention.

Taking the interconnecting manner shown in FIG. 3 as an example, member devices 1, 2 and 3 are connected in a chain-type stacking mode to form a stacking apparatus. The forwarding table of member device 1 is smaller than those of member devices 2 and 3 in size. When forwarding tables of member devices 2 and 3 are of the same size, since member device 2 is directly connected with member device 1 while member device 3 is indirectly connected with member device 1 via member device 2, member device 1 may choose member device 2 as its proxy device, and transmit all or part of its to-be-forwarded traffic to member device 2 to have the traffic forwarded by proxy forwarding. And member devices 2 and 3 forward respective to-be forwarded traffic.

Figure 4:
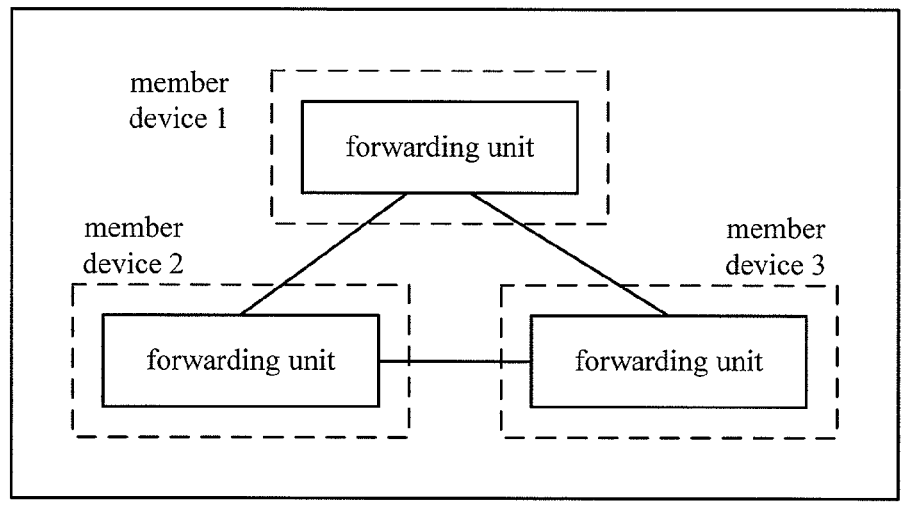
FIG. 4 is a schematic illustrating a network structure adopting a method for traffic forwarding in a stacking apparatus in accordance with an embodiment of the present invention.

Taking the interconnecting manner shown in FIG. 4 as an example, member devices 1, 2 and 3 are connected in a ring-type stacking mode to form a stacking apparatus. The forwarding table of member device 1 is smaller than those of member devices 2 and 3 in size. When forwarding tables of member devices 2 and 3 are of the same size, since member devices 2 and 3 are both directly connected with member device 1, member device 1 may choose member devices 2 and 3 both as its proxy devices with load balancing taken into account. Member device 1 transmits all or part of to-be-forwarded traffic to member devices 2 and 3 for proxy forwarding. And member devices 2 and 3 forward respective to-be-transmitted traffic.

In the present invention, when a member device transmits to-be-forwarded traffic to a proxy device, the following principles should be conformed to:

(1) a member device having the smallest forwarding table may transmit all its to-be-forwarded traffic to the proxy device which forwards the to-be-forwarded traffic; or the member device may forward part of the to-be-forwarded traffic according to the size of its forwarding table and transmit traffic beyond the forwarding capability of the member device to the proxy device to have the proxy device forward the traffic; the traffic beyond the forwarding capability may be, for example, a to-be-forwarded packet which fails to match contents of any original forwarding entry in the forwarding table.

(2) a member device having the largest forwarding table should forward all to-be-forwarded traffic by the member device itself;

(3) a member device having a forwarding table larger than the smallest forwarding table and smaller than the largest forwarding table in size may forward part of the traffic according to the forwarding capability of the member device and transmit traffic beyond the forwarding capability of the member device to a proxy device to have the proxy device forward the traffic.

The method for forwarding to-be-transmitted traffic applied to the above different situations will be described in the following.

For a member device having the smallest forwarding table, all or part of its to-be-transmitted traffic should be transmitted to a proxy device. When all to-be-transmitted traffic is required to be transmitted to the proxy device, a proxy entry is established in the member device with a priority higher than that of an original forwarding entry in the member device. When receiving to-be-transmitted traffic, the member device forwards the received traffic according to the proxy entry which is chosen in order of priority. For example, when member device 1 chooses member device 2 as its proxy device, member device 1 establishes a proxy entry in member device 1, configures a destination address and a mask length in the proxy entry and transmits all to-be-transmitted traffic to an interface connected to member device 2. The proxy entry identifies member device 2 by MODID. When only part of the to-be-transmitted traffic is required to be transmitted to the proxy device, a proxy entry is established in the member device with a priority lower than that of an original forwarding entry in the member device. When receiving to-be-transmitted traffic, the member device first forwards the received traffic according to the original forwarding entry which is chosen in order of priority. When a to-be-forwarded packet fails to match contents of any original forwarding entry, the member device forwards the packet which is beyond the forwarding capability of the forwarding entry to the proxy device according to the proxy entry which is properly configured to point to the proxy device. For example, when member device 1 chooses member device 2 as its proxy device, member device 1 establishes a proxy entry in member device 1, configures a destination address and a mask length in the proxy entry and forwards the traffic beyond the forwarding capability of a forwarding entry to an interface connected to member device 2 which is identified by MODID in the proxy entry. During the above process, in order to avoid a longest prefix matching failure in routing, it is necessary to remove some original routes whose masks are relatively short among the original forwarding entries from the forwarding table when establishing the proxy entry, where one route corresponds to one forwarding entry in the forwarding table.

For a member device having a forwarding table larger than the smallest forwarding table and smaller than the largest forwarding table in size, to-be-transmitted traffic beyond the forwarding capability of the member device should be forwarded to a proxy device. Therefore, a proxy entry has to be established in the member device with a priority lower than that of an original forwarding entry in the member device. When receiving to-be-transmitted traffic, the member device first forwards the received traffic according to the forwarding entry which is chosen in order of priority. When a to-be-forwarded packet fails to match contents in any forwarding entry, the member device forwards the packet beyond the forwarding capability of the forwarding entry to the proxy device according to the proxy entry which is properly configured to point to the proxy device. For example, when member device 1 chooses member device 2 as its proxy device, member device 1 establishes a proxy entry in member device 1, configures a destination address and a mask length in the proxy entry and forwards traffic beyond the forwarding capability of a forwarding entry to an interface connected to member device 2 which is identified by MODID in the proxy entry. During the above process, in order to avoid a longest prefix matching failure in routing, it is necessary to remove some original routes having relatively short mask from among the original forwarding entries while establishing the proxy entry.

According to the above method of the present invention, when a new member device joins the stacking apparatus or an original member device leaves the stacking apparatus, other devices in the stacking system have to determine whether the proxy device is subjected to a change. For example, when the proxy device of a member device leaves the stacking apparatus, the member device has to obtain a new proxy device or delete information of the original proxy device, and accordingly, modify or remove a proxy entry. For another example, when a new member device joins the stacking apparatus, a member device may need to set the new member device as its proxy device or change its proxy device from an original member device into the new member device, and accordingly, establish a new proxy entry or modify an original proxy entry.

A member device may get knowledge of the joining or leaving of another member device by various means, such as by receiving a hardware interrupt, or through a hand shaking process, and so on. Further, a member device may update relations between the MODIDs and the sizes of forwarding tables of the member devices stored in the member device, for example, by deleting a relation related with the member device leaving the stacking apparatus, or by setting the relation related with the member device leaving the stacking apparatus as invalid, or by adding a new relation which associates the MODID with the size of a forwarding table of the member device newly joined the stacking apparatus, and so on.

According to an embodiment, when a first member device leaves the stacking apparatus, a second member device may judge whether the first member device is the proxy device of the second member device, e.g., by comparing the MODID of the first member device with the MODID of the proxy device. If determining the proxy device leaves the stacking apparatus, the second member device may choose another member device as a new proxy device according to the updated relations. Then the second member device updates the proxy entry with information of the new proxy device.

According to another embodiment where each member device chooses the member device having the largest forwarding table as the proxy device, when a new member device joins the stacking apparatus, a member device may judge whether the forwarding table of the new member device is larger than the forwarding table of the proxy device. If determining the forwarding table of the new member device is larger than the forwarding table of the proxy device, the member device may choose the new member device as a new proxy device, and updates the proxy entry with information of the new proxy device.

In the embodiment where each member device chooses the member device having the largest forwarding table as the proxy device, the member device having the largest forwarding table and serving as the proxy device before the new member device joins the stacking apparatus may also judge whether the forwarding table of the new member device is larger than the forwarding table of the member device. If determining the forwarding table of the new member device is larger than the forwarding table of the member device, the member device may choose the new member device as its proxy device, and establish a proxy entry for the proxy device.

According to embodiments of the present invention, the new member device joining the stacking apparatus may firstly obtains relations between the MODIDs and the sizes of forwarding table of the member devices in the stacking apparatus, and judge whether there is a member device whose forwarding table is larger than the forwarding table of the new member device. If there is, the new member chooses a member device having a larger or the largest forwarding table as its proxy device and establishes a proxy entry in its forwarding table accordingly.

In addition, because the member devices in the stacking apparatus are allowed to have different sizes of forwarding tables, a main control board may be chosen from the member devices according to the sizes of forwarding tables of the member devices. The larger a forwarding table of a member device is, the higher the priority of the member device may be, and the member device may be preferably chosen as the main control board.

To make the objective, technical scheme and merits of the present invention clearer, the technical scheme of the present invention will be hereinafter described in detail with reference to a preferred embodiment. The preferred embodiment takes a layer-3 forwarding entry as an example.

Still referring to the interconnecting manner of devices shown in FIG. 3 as an example. The stacking apparatus is formed by three member devices (member devices 1, 2 and 3). The size of the forwarding table of member device 1 is 128000 items, the size of the forwarding table of member device 2 is 256 items, and the size of forwarding table of member device 3 is 12000 items.

According to a principle of choosing a proxy device in the present invention, member device 1 with the largest forwarding table is chosen as the proxy device. According to a principle of choosing a main control board, member device 1 is also chosen as the main control board of the stacking apparatus.

The forwarding table of member device 2 is the smallest, thus member device 2 does not perform layer-3 forwarding by member device 2 itself. Instead, member device 2 establishes a proxy entry and performs layer-2 forwarding to forward to-be-forwarded layer-3 traffic to a proxy port of its proxy device (i.e. member device 1) to have member device 1 forwards the traffic.

The forwarding table of member device 3 can meet requirements of basic functions, and thus a partial proxy mode can be adopted. For traffic that can be forwarded according to a local forwarding entry, the traffic is forwarded in member device 3. For traffic that can not be forwarded according to the local forwarding entry, the traffic is transmitted to a proxy port of the proxy device (i.e. member device 1) according to a proxy entry established, and is then forwarded by member device 1. Meanwhile, it should be guaranteed that problems such as the longest prefix matching failure in routing can be avoided.

When member device 1 leaves the stacking apparatus, member device 2 may choose member device 3 as a new proxy device, and the main control board is also switched to member device 3. Member device 3 removes original proxy entries related with member device 1, and member device 2 modifies its proxy entry into pointing to a proxy port of member device 3.

Specific implementation manners of the present invention can be completely or partially applied to maintenance of layer-2 or MPLS forwarding tables. The present invention can also be applied to proxy forwarding between single boards whose forwarding tables are different in size in a distributed rack-mounted equipment which has no exchanging network.

According to the method of the present invention, proxy forwarding is provided for a member device having a smaller forwarding table by utilizing forwarding capability of a member device having a larger forwarding table, so that forwarding capacities of member devices having different sizes of forwarding tables in the stacking apparatus are unified, and forwarding capabilities of the member devices in the stacking apparatus are fully used.

Figure 5:
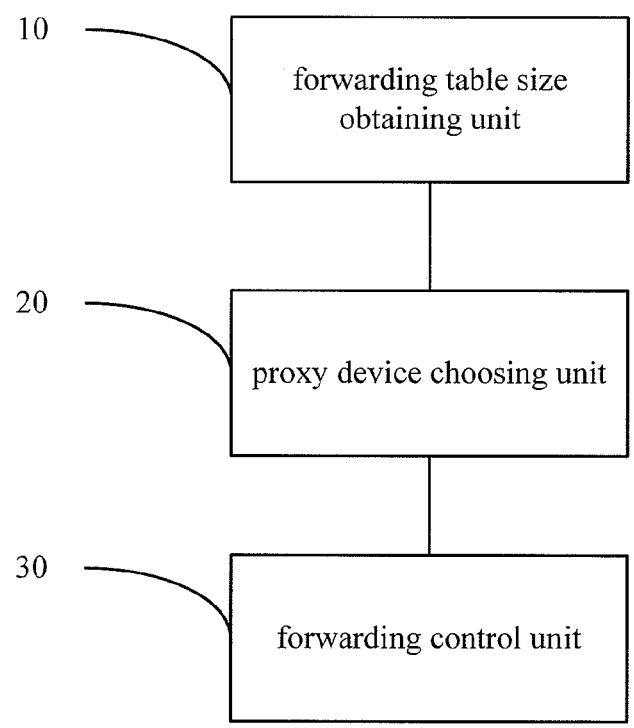
FIG. 5 is a schematic illustrating a structure of a member device according to an embodiment of the present invention.

An embodiment of the present invention also provides a member device in a stacking apparatus. As shown in FIG. 5, the member device may include:

a forwarding table size obtaining unit 10, adapted to obtain a size of a forwarding table of each member device in a stacking apparatus;

a proxy device choosing unit 20, adapted to choose a member device having the largest forwarding table or another member device whose forwarding table is larger than the forwarding table of the member device as a proxy device when detecting another member device in the stacking apparatus has a forwarding table larger than that of the member device based on an obtaining result of the forwarding table size obtaining unit 10;

a forwarding control unit 30, adapted to transmit all or part of to-be-forwarded traffic to the proxy device chosen by the proxy device choosing unit 20 to have the proxy device forward the traffic.

Specifically, the forwarding table size obtaining unit 10 is adapted to:

obtain a MODID of each member device in the stacking apparatus, identify each member device by the MODID, and establish a relation for each member device which associates a MODID of the member device with a size of a forwarding table of the member device.

When the forwarding table size obtaining unit 10 obtains multiple member devices having the largest forwarding tables, the proxy device choosing unit 20 is adapted to:

choose one or more member devices having the largest forwarding tables as one or more proxy devices according to connection relations between the member device with the multiple member devices having the largest forwarding tables and/or according to a policy for forwarding load balancing the multiple member devices having the largest forwarding tables.

Specifically, the forwarding control unit 30 is adapted to:

when determining the member device has the smallest forwarding table, establish a proxy entry which makes egress information of all to-be-forwarded traffic or egress information of to-be-forwarded traffic beyond forwarding capability of the member device point to the proxy device according to the proxy entry, e.g., by recording the MODID of the proxy device or information of a port which connects the member device with the proxy device in the proxy entry;

when determining that the forwarding table of the member device is larger than the smallest forwarding table and smaller than the forwarding table of the proxy device in size, establish a proxy entry which makes egress information of to-be-forwarded traffic beyond forwarding capability of the member device point to the proxy device.

The forwarding control unit 30 is further adapted to: forward the to-be-forwarded traffic locally when determining that a forwarding table of the member device is not smaller than a forwarding table of any member device in the stacking apparatus.

The proxy device choosing unit 20 is further adapted to update, when a member device in the stacking apparatus is subjected to a change, the proxy device according to a size of a forwarding table of each member device after the change; and notify the forwarding control unit 30 to transmit the to-be-forwarded traffic to the updated proxy device to have the traffic forwarded.

The forwarding table size obtaining unit 10 is further adapted to update, when a member device in the stacking apparatus is subjected to a change, the relations between the MODID and the size of forwarding table of the member devices. For example, for a first member device leaving the stacking apparatus, the forwarding table size obtaining unit 10 may delete the relation established for the first member device or setting the relation established for the first member device as invalid; for a second member device joining the stacking apparatus, the forwarding table size obtaining unit 10 may establish a new relation for the second member device utilizing the MODID and the size of a forwarding table of the second member device obtained through a hand shaking process.

According to an embodiment of the present invention, when a member device leaves the stacking apparatus, the proxy device choosing unit 20 is further adapted to judge whether the member device leaving the stacking apparatus is the proxy device of the member device; to choose another member device whose forwarding table is larger than the forwarding table of the member device as a new proxy device of the member device when there is another member device whose forwarding table is larger than the forwarding table of the member device; the forwarding control unit 30 is adapted to update the proxy entry with information of the new proxy device.

According to another embodiment of the present invention where a member device chooses a member device having the largest forwarding table, when a new member device joins the stacking apparatus, the proxy device choosing unit 20 is further adapted to: judge whether the forwarding table of the new member device is larger than the forwarding table of the proxy device; and to choose the new member device as a new proxy device of the member device if determining the forwarding table of the new member device is larger than the forwarding table of the proxy device; the forwarding control unit 30 is adapted to update the proxy entry with information of the new proxy device, and transmit at least part of to-be-forwarded traffic to the new proxy device.

In the embodiment of the present invention where each member device chooses a member device having the largest forwarding table, when the member device has the largest forwarding table before a new member device joins the stacking apparatus, the proxy device choosing unit 20 of the member device is further adapted to: judge whether the forwarding table of the new member device is larger than the forwarding table of the proxy device; and to choose the new member device as the proxy device of the member device; the forwarding control unit 30 is adapted to establish a proxy entry which makes egress information of at least part of to-be-forwarded traffic point to the proxy device.

In the present invention, the forwarding capability of member devices having larger forwarding tables is utilized for providing proxy forwarding for member devices having smaller forwarding tables, so that the forwarding capacities of member devices having different forwarding table sizes in the stacking apparatus are unified and the forwarding capabilities of the member devices in the stacking apparatus are fully used.

According to the above description of embodiments, it can be clearly understood by those skilled in the art that the present invention can be implemented by hardware or by software with necessary general hardware platforms. Based on that, the technical scheme of the present invention can be in the form of a software product. The software product may be stored in a nonvolatile storage medium (such as CD-ROM, flash memory, or portable hard disk) and include several instructions to make computer apparatus (such as a personal computer, a server or a network device) perform the method provided by embodiments of the present invention.

Those skilled in the art can understand that the drawings are just schematic diagrams of preferred embodiments, units or steps in the drawings may not be necessary to the present invention.

Those skilled in the art can also understand that the units in the member device in the above embodiments may be located in the member device according to the above embodiments, or be located in a device or multiple devices different from the above embodiments. The units in the above embodiments may be combined as one unit or may be further divided into multiple subunits.

The above embodiments are arranged only for description convenience, not presented in order of excellence.

What is claimed is:

1. A member device in a stacking apparatus, comprising:
   a forwarding table size obtaining unit, adapted to obtain a size of a forwarding table of each member device in the stacking apparatus;
   a proxy device choosing unit, adapted to choose another member device which has the largest forwarding table in the stacking apparatus as a proxy device when there is another member device whose forwarding table is larger than the forwarding table of the member device according to an obtaining result of the forwarding table size obtaining unit;
   a forwarding control unit, adapted to establish a proxy entry whose egress information points to a Module Identity (MODID) of the proxy device and whose priority is lower than that of an original forwarding entry in the member device, remove at least one original route whose mask is shorter than the other original routes in original forwarding entries from the forwarding table; forward to-be-transmitted traffic according to the original forwarding entries which is chosen in order of priority after receiving the to-be-transmitted traffic; and forward a to-be-forwarded packet which fails to match contents of any original forwarding entry to an interface of the proxy device that is identified by the MODID in the proxy entry.

2. The member device of claim 1, wherein the forwarding table size obtaining unit is adapted to: obtain a Module Identity (MODID) of each member device in the stacking apparatus, identify each member device by the MODID, and establish a relation for each member device which associates a MODID of the member device with a size of a forwarding table of the member device.

3. The member device of claim 2, wherein the proxy device choosing unit is adapted to choose, when there is another member device whose forwarding table is larger than the forwarding table of the member device, a member device having the largest forwarding table as a proxy device.

4. The member device of claim 3, wherein the proxy device choosing unit is further adapted to: judge, when a new member device joins the stacking apparatus, whether the forwarding table of the new member device is larger than the forwarding table of the proxy device; and to choose the new member device as a new proxy device of the member device if the forwarding table of the new member device is larger than the forwarding table of the proxy device;
   wherein the forwarding control unit is adapted to transmit at least part of to-be-forwarded traffic to the new proxy device.

5. The method of claim 3, wherein the proxy device choosing unit is further adapted to: judge, when the member device has the largest forwarding table before a new member device joins the stacking apparatus, whether the forwarding table of the new member device is larger than the forwarding table of the member device; and to choose the new member device as a proxy device of the member device if the forwarding table of the new member device is larger than the forwarding table of the member device;
   wherein the forwarding control unit is adapted to transmit at least part of to-be-forwarded traffic of the member device to the proxy device.

6. The member device of claim 1, wherein when the forwarding table size obtaining unit obtains multiple member devices whose forwarding tables are larger than the forwarding table of the member device, the proxy device choosing unit is adapted to:
   choose at least one member device from the multiple member devices whose forwarding tables are larger than the forwarding table of the member device as at least one proxy device according to at least one of:
   a connection relation between the member device and the multiple member devices whose forwarding tables are larger than the forwarding table of the member device, and a policy for balancing forwarding load of the multiple member devices whose forwarding tables are larger than the forwarding table of the member device.

7. The member device of claim 1, wherein the forwarding control unit is further adapted to: forward the to-be-forwarded traffic locally when determining that the forwarding table of the member device is not smaller than a forwarding table size of any other member devices in the stacking apparatus.

8. The member device of claim 1, wherein the proxy device choosing unit is further adapted to update, when a member device in the stacking apparatus is subjected to a change, the proxy device according to a size of a forwarding table of each member device after the change; and notify the forwarding control unit to transmit the to-be-forwarded traffic to the updated proxy device to make the updated proxy device forward the traffic.

9. The member device of claim 1, wherein the proxy device choosing unit is further adapted to: judge, when a member device leaves the stacking apparatus, whether the member device leaving the stacking apparatus is the proxy device of the member device; to choose another member device whose forwarding table is larger than the forwarding table of the member device as a new proxy device of the member device when there is another member device whose forwarding table is larger than the forwarding table of the member device;
   wherein the forwarding control unit is adapted to transmit at least part of to-be-forwarded traffic to the new proxy device.

10. A method for traffic forwarding in a stacking apparatus which includes multiple member devices, comprising:
    obtaining, by a first member device, a size of a forwarding table of each member device in the stacking apparatus;
    choosing, by the first member device, a second member device having the largest forwarding table in the stacking apparatus as a proxy device when there is a member device whose forwarding table is larger than the forwarding table of the first member device in the stacking apparatus;
    establishing, by the first member device, a proxy entry whose egress information points to a Module Identity (MODID) of the proxy device and whose priority is lower than that of an original forwarding entry in the member device, and removing at least one original route whose mask is shorter than the other original routes in original forwarding entries from the forwarding table;

forwarding, by the member device, to-be-transmitted traffic according to the original forwarding entries which is chosen in order of priority after receiving the to-be-transmitted traffic; and forwarding, by the member device, a to-be-forwarded packet which fails to match contents of any original forwarding entry to an interface of the proxy device that is identified by the MODID in the proxy entry.

11. The method of claim 10, wherein choosing by the first member device a second member device having a forwarding table larger than a forwarding table of the first member device as a proxy device comprises:

choosing, by the first member device, a member device having the largest forwarding table in the stacking apparatus as the proxy device when there is a member device whose forwarding table is larger than the forwarding table of the first member device.

12. The method of claim 11, further comprising:

judging, by the first member device when a new member device joins the stacking apparatus, whether the forwarding table of the new member device is larger than the forwarding table of the proxy device; and choosing, by the first member device, the new member device as the proxy device of the first member device if the forwarding table of the new member device is larger than the forwarding table of the proxy device.

13. The method of claim 11, further comprising:

judging, by the member device having the largest forwarding table before a new member device joins the stacking apparatus, whether the forwarding table of the new member device is larger than the forwarding table of the member device; and choosing, by the member device, the new member device as the proxy device of the member device if the forwarding table of the new member device is larger than the forwarding table of the member device.

14. The method of claim 10, wherein obtaining by the first member device a size of a forwarding table of each member device in the stacking apparatus comprises:

obtaining, by the first member device, a Module Identity (MODID) of each member device in the stacking apparatus, identifying each member device by the MODID, and establishing a relation for each member device which associates the MODID of the member device with the size of the forwarding table of the member device.

15. The method of claim 10, wherein choosing by the first member device a second member device having a forwarding table larger than a forwarding table of the first member device as a proxy device comprises:

when there are multiple member devices whose forwarding tables are larger than the forwarding table of the first member, choosing, by the first member device, at least one second member device from the multiple member devices whose forwarding tables are larger than the forwarding table of the first member device as at least one proxy device according to at least one of:

a connection relation between the first member device and the multiple member devices whose forwarding tables are larger than the forwarding table of the first member device; and a policy for forwarding load balancing the multiple member devices whose forwarding tables are larger than the forwarding tables of the first member device.

16. The method of claim 10, wherein the first member device forwards the to-be-transmitted traffic locally when the forwarding table of the first member device is not smaller than any other member devices in the stacking apparatus.

17. The method of claim 10, further comprising:

when a member device in the stacking apparatus is subjected to a change, updating, by the first member device, the proxy device according to a size of a forwarding table of each member device after the change and making the egress information of the proxy entry point to MODID of the updated proxy device; and transmitting the to-be-forwarded traffic to the updated proxy device which forwards the traffic.

18. The method of claim 10, further comprising:

judging, by the first member device when a member device leaves the stacking apparatus, whether the member device leaving the stacking apparatus is the proxy device of the first member device; and choosing, by the first member device, another member device as a new proxy device of the first member device if the member device leaving the stacking apparatus is the proxy device of the first member device, and transmitting at least part of to-be-forwarded traffic to the new proxy device.

* * * * *

UNITED STATES PATENT AND TRADEMARK OFFICE
CERTIFICATE OF CORRECTION

| | |
|---|---|
| PATENT NO. | : 8,452,893 B2 |
| APPLICATION NO. | : 12/840650 |
| DATED | : May 28, 2013 |
| INVENTOR(S) | : Jie Li |

It is certified that error appears in the above-identified patent and that said Letters Patent is hereby corrected as shown below:

In the Claims

In column 11, line 66, in Claim 5, delete "method" and insert -- member device --, therefor.

Signed and Sealed this
Twentieth Day of August, 2013

Teresa Stanek Rea
*Acting Director of the United States Patent and Trademark Office*